UNITED STATES PATENT OFFICE.

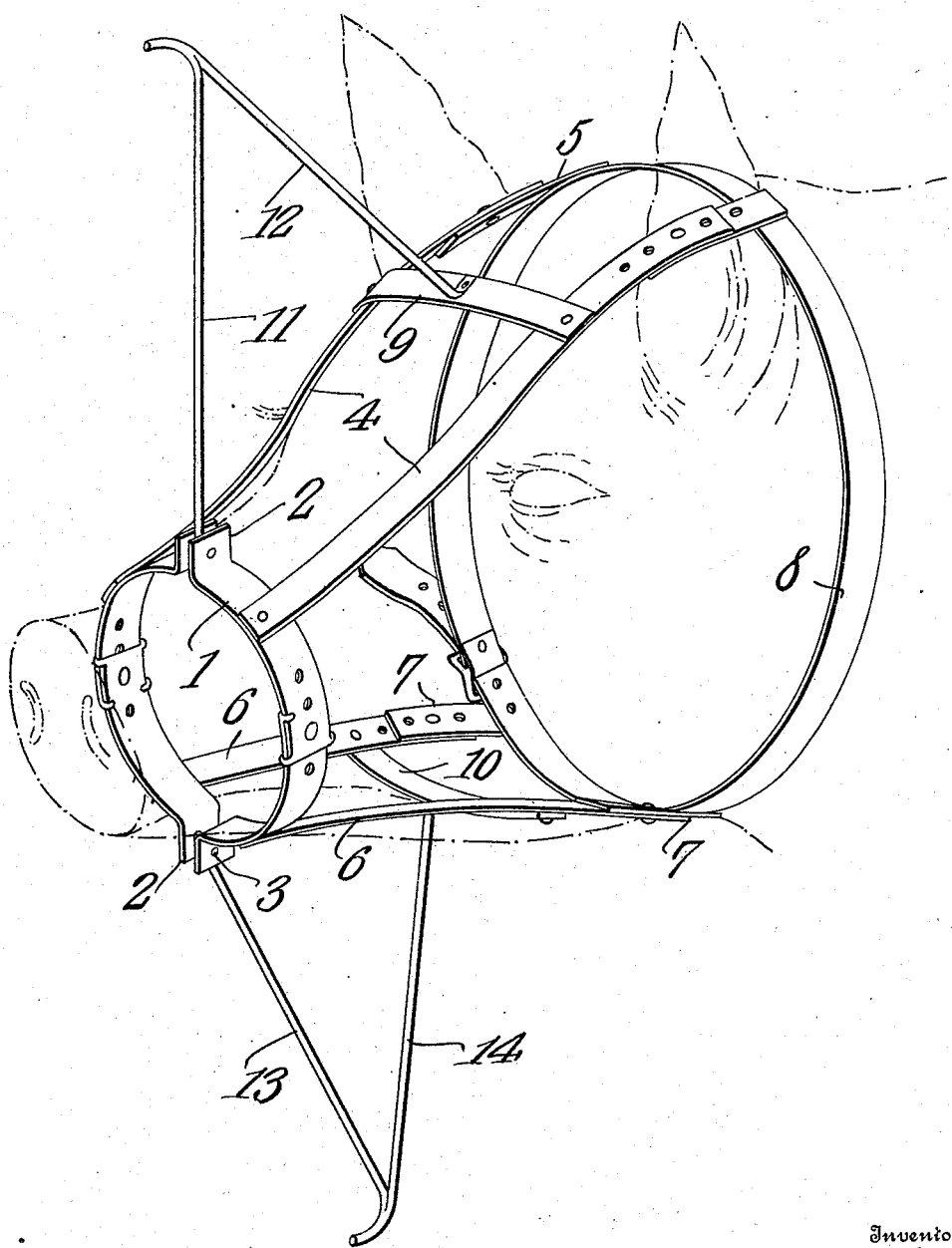

THOMAS L. DOUGLASS, OF RALSTON, OKLAHOMA.

HOG-POKE.

No. 911,706.　　　　Specification of Letters Patent.　　　　Patented Feb. 9, 1909.

Application filed February 21, 1908. Serial No. 417,140.

*To all whom it may concern:*

Be it known that I, THOMAS L. DOUGLASS, a citizen of the United States, residing at Ralston, in the county of Pawnee and State of Oklahoma, have invented a new and useful Hog-Poke, of which the following is a specification.

This invention has relation to animal pokes of the character indicated and it consists in the novel construction and arrangement of its parts as hereinafter shown and described.

The object of the invention is to provide a poke having adjustable parts which may be easily and quickly fitted to heads of different sizes and being of such an arrangement as not to interfere with the movement of the animal's jaws during the process of eating, drinking and the like.

The upper and lower portions of the poke are provided with upwardly and downwardly projecting hooks which are adapted to engage the wires or rails of a fence should the animal attempt to squeeze through, root under, or jump over the same and the said hooks are supported by braces which bear upon cross pieces located above the forehead and beneath the lower jaw so that when the said hooks come in contact with obstructions, such as above named, the said cross pieces are forced into contact with adjacent portions of the animal's head thereby subjecting the sense of feeling to sufficient pain to cause the animal to back away from the obstruction it is attempting to overcome.

In the accompanying drawing the figure is a perspective view of the poke.

The poke consists of the nose band 1 which is made up of sections having flanges 2 which are riveted together. Each of the said sections is made up of two or more pieces which are adapted to be slipped longitudinally and secured by rivets 3 or similar devices. Thus means is provided for increasing or diminishing the diameter of the nose band. The forward ends of the forehead strips 4 are fixed to the upper portion of the nose band 1 and the said strips at intermediate points are longitudinally extensible or provided with the sections 5 which may be slipped longitudinally with relation to the strips and fixed with relation thereto by means of suitable securing devices. The forward ends of the jaw strips 6 are fixed to the lower part of the nose band 1 and the strips 6 are also provided with sections 7 which may be adjusted in a manner similar to that described in connection with the sections 5. In other words, the strips 4 and 6 are longitudinally extensible in order to fit the poke upon a long or a short head. The throat latch 8 is fixed to the rear ends of the strips 4 and 6 and is adapted to encircle or bind the throat of the animal. The cross piece 9 connects the rear portions of the strips 4 together and the cross piece 10 connects the rear portions of the strips 6 together. The cross piece 9 lies transversely across the middle of the forehead of the animal and the cross piece 10 lies transversely across the lower jaw of the animal when the poke is in position upon the head. The lower end of the hook 11 is secured to the upper portion of the nose band 1 between the upper flanges 2 thereof. Said hook is upwardly and rearwardly inclined and the brace 12 connects the upper portion of the said hook with the cross piece 9. The upper end of the hook 13 is secured to the lower portion of the nose band 1 between the lower flanges 2 thereof. The hook 13 is downwardly and rearwardly inclined and the brace 14 connects the lower portion of the hook 13 with the cross piece 10. With the exception of the throat latch 8, the parts of the poke are made of metal and possess a sufficient amount of resiliency or spring.

It will be observed that the parts may be readily adjusted to fit a head of particular size and that should an animal move its head so as to bring either one of the hooks 11 or 13 in contact with a fence or similar obstruction the movement of the animal toward the said obstruction will be checked and at the same time the force of impact upon the hook will be transmitted along the attached brace to one of the cross pieces 9 or 10 which will be moved into contact with the adjacent part of the head and appeal to the animal's sense of feeling.

Having described my invention, what I claim as new and desire to secure by Letters Patent is:

1. A poke comprising a nose band, strips connected to said nose band, a throat latch attached to the strips and hooks mounted upon the upper and lower portions of the nose band, one hook having a bracing portion adapted to lie over the forehead, and the other hook having a bracing portion adapted to lie under the throat of the animal.

2. A poke comprising a nose band, strips attached thereto, a throat latch connecting the strips together, cross pieces attached to the strips, hooks mounted upon the nose band and braces connecting said hooks with the cross pieces.

3. A poke comprising a sectional nose band having flanges, strips attached to the nose band, a throat latch attached to the strips, hooks attached to the upper and lower portions of the nose band, between the flanges, one hook having a bracing portion adapted to lie over the forehead, and the other hook having a bracing portion adapted to lie under the throat of the animal.

4. A poke comprising a diametrically adjustable nose band, longitudinally extensible strips attached thereto, a throat latch attached to the strips, cross pieces connecting the strips together and hooks mounted upon the nose band and braces attached to the hooks and cross pieces.

In testimony that I claim the foregoing as my own, I have hereto affixed my signature in the presence of two witnesses.

THOMAS L. DOUGLASS.

Witnesses:
W. L. HER,
GUY K. MARSHALL.